UNITED STATES PATENT OFFICE.

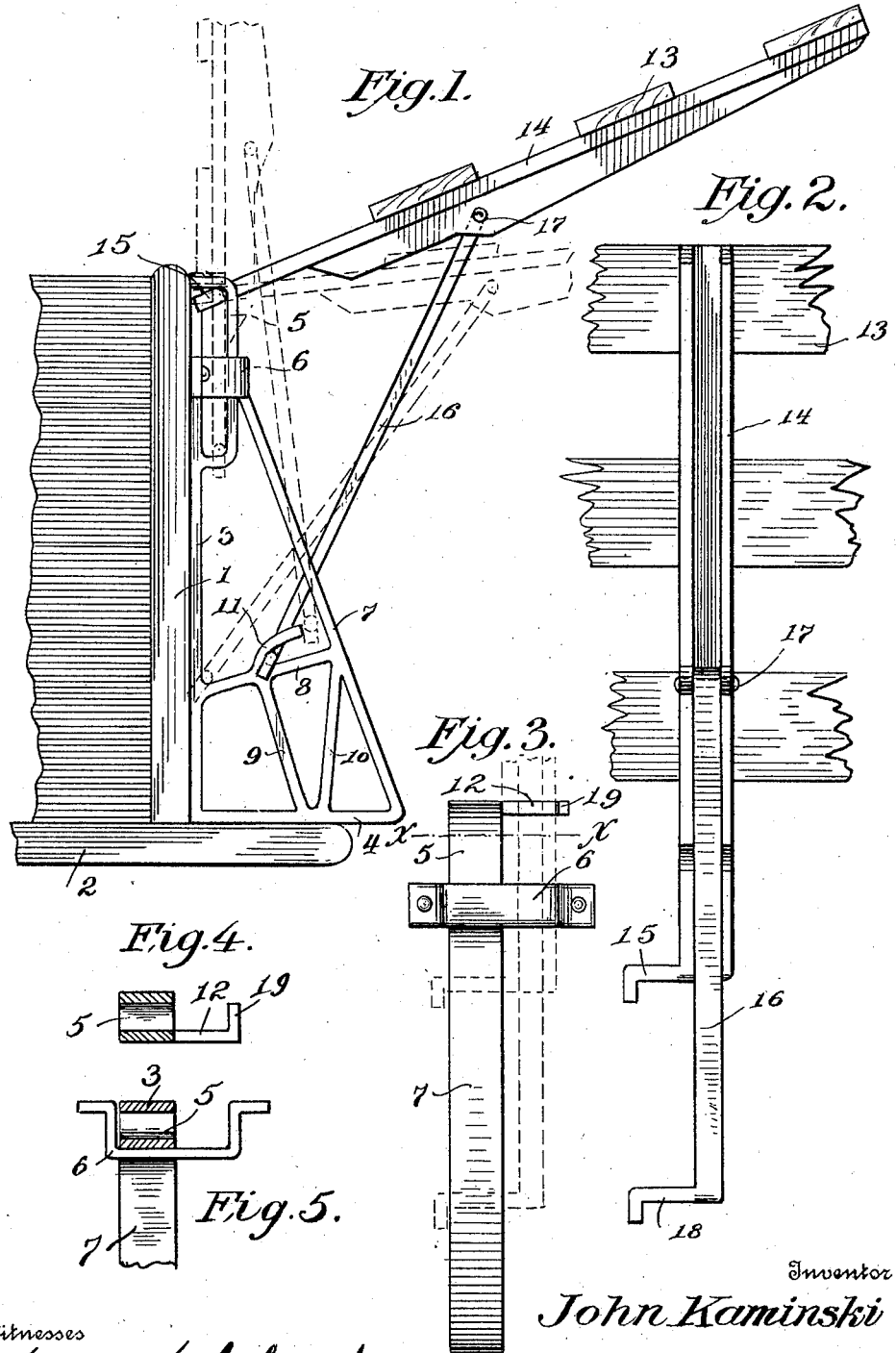

JOHN KAMINSKI, OF HILLIARDS, MICHIGAN.

FARM-WAGON BRACKET.

972,082.  Specification of Letters Patent.  Patented Oct. 4, 1910.

Application filed October 14, 1909. Serial No. 522,521.

*To all whom it may concern:*

Be it known that I, JOHN KAMINSKI, a citizen of the United States, residing at Hilliards, in the county of Allegan and State of Michigan, have invented new and useful Improvements in Farm - Wagon Brackets, of which the following is a specification.

This invention provides supporting means for use in connection with a farm wagon for securing a rack in the desired position, whereby the wagon may be utilized for transporting stock or for hauling hay, straw, or like product requiring a rack for receiving the same, said means being applicable to the usual farm wagon and admitting of the rack being adjusted to the vertical or the horizontal and secured in the required position according as the wagon is to be adapted for moving stock or hay, or the like.

The invention consists of the novel features, details of construction and combination of parts, which hereinafter will be more particularly set forth, illustrated in the accompanying drawing, and pointed out in the appended claims.

Referring to the drawing, forming a part of the specification, Figure 1 is a view in elevation of a bracket and coöperating parts, showing the same applied to a wagon body and rack, the dotted lines showing adjusted positions of the rack and brace therefor. Fig. 2 is a front view of a portion of the rack, showing the arm and brace attached thereto in elevation. Fig. 3 is a front view of the bracket detached from the wagon body and having the rack and rack arm brace removed therefrom. Fig. 4 is a section on the line $x$—$x$ of Fig. 3, looking upward. Fig. 5 is a section on the line $x$—$x$ of Fig. 3, looking downward.

Corresponding and like parts are referred to in the following description, and indicated in all the views of the drawing, by the same reference characters.

A portion of the body of a farm wagon is illustrated in Fig. 1 to show the application of the invention, said body comprising a side 1 and a cross piece or cleat 2, the latter being arranged beneath the body and having an end portion extended to receive the base of the bracket, which is secured to a side of the wagon body. It is to be understood that there may be as many brackets along the side of the wagon as may be found necessary to insure stability of construction.

The bracket comprises a vertical member 3, a horizontal member 4, a loop 5 at the upper end of the member 3, a keeper 6 intermediate the ends of the loop 5, and a brace 7 between the loop 5 and the outer end of the member 4. The vertical member 3 extends along the side of the wagon body and may be secured thereto in any manner.

The horizontal member 4 rests upon the extended end of the cross piece or cleat 2. A stay 8 is arranged between the lower portions of the vertical member 3 and the brace 7 and inclines upwardly and outwardly and is provided upon its upper side with a hook 11. Braces 9 and 10 connect the stay 8 with the horizontal member 4 and are upwardly diverged. The several parts of the bracket are of integral formation, being elements of a single casting. The keeper 6 extends horizontally and braces the bracket at its upper end and forms secure attaching means of the bracket to the side of the wagon body. The extension 12 projects laterally from the upper end of the vertically extending loop 5 and the member 3 and is formed at its outer end with a lug 19, which engages the rack arm so as to retain the same in fixed position when the rack is in vertical position. The rack arm 14 has running connection with the loop 5, thereby admitting of the rack assuming either a vertical position or an inclined position.

The rack comprises a series of slats 13 and arms 14, said slats being secured to the arms in any substantial way and the arms 14 extending beyond the inner or lowermost slat of the rack and are adapted to make adjustable and detachable connection with the loop 5 of the bracket. A hook 15 projects laterally from the lower end of the rack arm 14 and is adapted to enter the space of the loop 5 and engage with the edge of the loop remote from that adjacent the rack arm when the parts are in position. The purpose of the hook 15 is to prevent displacement of the rack arm after the same has been properly fitted to the loop 5. When placing the rack in position it is turned into vertical position, thereby bringing the hook 15 in line with the loop 5, after which the rack is moved to cause the hook 15 to pass through the loop 5 and engage with the edge thereof opposite the edge adjacent the rack arm. When the rack is turned so as to extend outwardly from the wagon body the hook 15 engages an edge of the member 3 and when the rack is turned into vertical position the hook 15 engages an edge of the loop 5 at its lower end. A brace 16 is pivoted at its upper end at 17 to the rack arm and its lower end is provided with a hook 18 similar in formation to the hook 15 and adapted to engage the edge of the stay 8 remote from the edge adjacent the brace 16, thereby preventing lateral displacement of the brace when the parts are properly assembled. When the hook 18 of the brace 16 is engaged with the hook 11 of the stay 8 the rack is held in one position and when said hook 18 is moved to lie in the angle formed between the member 3 and stay 8 the outer end of the rack is lowered, as indicated by the dotted lines in Fig. 1. When the rack is moved to a position to extend outwardly from the wagon body the wagon is adapted for receiving hay, straw or like material, but when the rack is moved into vertical position, as indicated by the dotted lines in Fig. 1, the wagon is adapted for transporting stock, as will be readily comprehended.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A bracket for farm wagons comprising a vertical member having a vertically extending loop at its upper end and having a lateral projection at the upper end of the loop terminating in a forwardly extending lug, a brace having connection at its upper end with the vertically extending loop and inclined outwardly and downwardly, an upwardly and outwardly inclined stay having connection at its ends with the lower portions of said vertical member and brace and having a stop in its length, a rack arm having a hook at its lower end making running connection with the vertical loop at the upper end of the bracket, said rack arm when in vertical position being engaged by the lateral projection, lug, and vertical loop at the upper end of the bracket, and a brace pivoted at its upper end to the rack arm and having a hook at its lower end to adjustably engage the aforesaid stay.

2. In combination with a farm wagon and a rack, a bracket secured to a side of the wagon and comprising vertical and horizontal members, the vertical member being provided at its upper end with a vertically extending loop and a lateral projection, a horizontal keeper located intermediate the ends of the loop, a brace between the loop and horizontal member, an upwardly and outwardly inclined stay arranged between the lower portions of the vertical member and brace, other braces between said stay and the horizontal member of the bracket, and a hook provided upon said stay, a rack arm having a laterally extending hook at its lower end to make running connection with the vertical loop of the bracket, and a brace pivoted at its upper end to the rack arm and provided at its lower end with a laterally extending hook to engage the hook applied to said stay, or to rest in the angle formed between said stay and the vertical member.

In testimony whereof I affix my signature in presence of two witnesses.

JOHN KAMINSKI.

Witnesses:
 MORRIS EHLE,
 L. D. CHAPPLE.